United States Patent
Munday et al.

(10) Patent No.: US 6,201,803 B1
(45) Date of Patent: Mar. 13, 2001

(54) CELLULAR RADIO LOCATION SYSTEM

(75) Inventors: Peter R Munday, Berkshire; Ian Goetz, Oxfordshire; Stephen M Gannon, Buckinghamshire, all of (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 08/945,639

(22) PCT Filed: May 1, 1996

(86) PCT No.: PCT/GB96/01039

§ 371 Date: Nov. 17, 1997

§ 102(e) Date: Nov. 17, 1997

(87) PCT Pub. No.: WO96/35306

PCT Pub. Date: Nov. 7, 1996

(30) Foreign Application Priority Data

May 2, 1995 (GB) .................................................. 9508884

(51) Int. Cl.[7] ........................................................ H04J 3/06
(52) U.S. Cl. ................................................ 370/350; 370/347
(58) Field of Search ................................... 370/347, 350, 370/337, 321, 310, 335, 345, 328; 455/455, 456, 457, 13.2; 375/344, 441

(56) References Cited

U.S. PATENT DOCUMENTS

| | | |
|---|---|---|
| 4,975,710 | 12/1990 | Baghdady . |
| 5,293,645 | 3/1994 | Sood . |
| 5,327,144 | 7/1994 | Stilp et al. . |
| 5,365,516 | 11/1994 | Jandrell . |
| 5,390,216 * | 2/1995 | Biltza ................................ 370/328 |
| 5,613,195 * | 3/1997 | Ooi ................................... 455/13.2 |
| 5,613,205 * | 3/1997 | Dufour ............................. 455/440 |
| 5,629,710 * | 5/1997 | Sawada ............................ 455/456 |
| 5,648,991 * | 7/1997 | Namekata ........................ 375/441 |
| 5,703,873 * | 12/1997 | Ojanpera ......................... 370/335 |
| 5,710,796 * | 1/1998 | Jarvela ............................. 375/344 |
| 5,778,075 * | 7/1998 | Haartsen ......................... 375/138 |
| 5,784,368 * | 7/1998 | Weigand ......................... 370/350 |
| 5,815,538 * | 9/1998 | Grell ................................ 455/456 |
| 5,838,672 * | 11/1998 | Ranta .............................. 370/335 |
| 5,844,522 * | 12/1998 | Sheffer ............................ 455/456 |
| 5,901,358 * | 5/1999 | Petty ................................ 455/457 |

FOREIGN PATENT DOCUMENTS

| | | |
|---|---|---|
| 0 241 565 | 10/1987 | (EP) . |
| 0 588 086 | 3/1994 | (EP) . |
| 92 05672 | 4/1992 | (WO) . |
| 95 00821 | 1/1995 | (WO) . |

* cited by examiner

Primary Examiner—Douglas W. Olms
Assistant Examiner—Ricardo M. Pizarro
(74) Attorney, Agent, or Firm—Nixon & Vanderhye P.C.

(57) ABSTRACT

The location of mobile unit cellular radio system is determined by determining the differences in timing of a characteristic feature of the transmission of the control channel of each of a plurality of base stations as measured at the mobile unit. The characteristic feature may, for example, be the training signal already used by the mobile unit in a cellular system to measure signal strength in handover operations. By determining the differences between time of arrival of transmissions from four base stations, location in two dimensions can be derived without prior knowledge of the actual distance to any of the base stations. A fifth base station allows location in three dimensions to be determined.

50 Claims, 4 Drawing Sheets

CELLULAR RADIO LOCATION SYSTEM

This application is the national stage of PCT/GB96/01039, filed May 1, 1996.

BACKGROUND OF THE INVENTION

This Invention relates to radio location systems. A number of systems are being developed for identifying the location of a mobile unit, using radio propagation characteristics. One such system is the Global Positioning System (GPS), in which a portable unit obtains a position fix using radio transmissions from space satellites. This system is highly accurate, but requires special equipment, and is unreliable in locations having poor visibility of the sky, because several widely separated satellites must be in line-of-sight relationship with the handset for a fix to be obtained.

Several proposals have been made for systems which use the radio propagation characteristics of a cellular radio system to provide a position fix for a cellular radio mobile unit. This would allow the mobile unit itself to act as a position finding device. As is well known, cellular radio systems allow a user having a portable handset (a "mobile unit") to make and receive telephone calls, either to another mobile unit or to a conventional fixed termination, by means of a radio link. The radio link is established between the mobile unit and one of a network of fixed radio base stations distributed over the area to be covered. The system allows any mobile unit to communicate through any of the base stations; usually the mobile unit will communicate through the base station providing the best quality radio signal.

Because the mobile unit may move during the course of a call, it can become necessary for it to move out of range of the base station with which the call was initially established. Cellular radio systems therefore include handover systems to allow communication to be established with a second base station, and dropped from the first, without interrupting the call itself as perceived by either party to the call. In the system known as GSM, (Global System for Mobile communications), the mobile unit frequently monitors the BCCHs (Broadcast Control CHannels) of the surrounding base stations in order to establish which base station is providing the best signal, and therefore through which base station a new call should be established, or whether a handover should be initiated. This process occurs in both idle and active modes, i.e. there is no need for the user to make a call.

Developments in GPS technology mean that a highly accurate synchronisation source can now be implemented relatively cheaply at each cellular radio base site. A good source of synchronisation has a number of benefits, these include; improved handover, an ability to reduce the effect of interference between neighbouring base stations, and enabling highly accurate radiating frequencies on the radio interface. It should be noted that unlike simple broadcast time signals, the GPS synchronisation signal takes the position of the GPS receiver into account, and can therefore compensate for the time lag caused by the finite speed of radio waves.

European patent Specification EP0320913, (Nokia), describes a system in which timing pulses derived from the GPS system are transmitted from each of three or more base stations, and their different arrival times at the mobile unit are used to identify the position of the unit. This prior art system requires the mobile unit to interrogate each base station in turn, which requires it to hand over communication between the various base stations in order to carry out this interrogation. This requires the use of several traffic channels, or an auxiliary channel and also requires that reliable radio communication can be established with each nearby base station.

In International Patent Application WO95/00821 (Omniplex) each base station transmits synchronised packet data signals. The mobile unit monitors all the base stations' packet data channels simultaneously, which either requires a mobile unit capable of receiving several radio frequencies at once, or that all the base stations transmit their data packets on the same channel. Neither of these features are conventional in a cellular radio system.

Both of these systems also require the transmission of special timing or synchronisation pulses from the cell sites (base stations) to the mobile unit, and the recognition of these pulses by the mobile unit. This requirement not only imposes a signalling overhead on the mobile unit, but it requires additional functionality in the mobile unit to recognise the timing pulses.

SUMMARY OF THE INVENTION

According to the invention, there is provided a method of determining the location of a mobile unit of a cellular radio system having a plurality of base stations, comprising the steps of determining the differences in timing between the base stations' transmissions as measured at the mobile unit, determining from the timing differences the differences in the distance of the mobile unit from each of the base stations, and deriving the location of the mobile unit from the differences in distance so determined, characterised in that the time division frame structures of the control channels of at least some of the base stations within radio range of the mobile unit are synchronised, and the mobile unit determines the differences in timing at the mobile unit of a characteristic feature of the time division frame structure broadcast by the control channel of each base station.

By using the control channel the mobile unit is able to make use of the existing radio link quality monitoring systems used to establish whether a handover should take place, and does not need to establish full communication with any of the base stations.

Preferably the characteristic feature used is a training signal transmitted by each base station, which is correlated with a reference training signal stored by the mobile unit. Such a "synchronisation burst" (SCH), and its correlation process already form part of the GSM standard for characterising the radio path for the purpose of identifying candidate base stations for handover. The method of the invention can therefore make use of these existing signals and correlation analysis programming. However, for position determination it is preferred that the system should use the first identified correlation of the reference signal, rather than the strongest as is use d for handover determination. This ensures that the most direct signal path, rather than a stronger but more indirect path, is used for distance calculation.

The derived location may also be time averaged to minimise the effects of spurious results from reflected signals, which would make the apparent distance between the base station and the mobile unit longer than it really is.

The derived location may be communicated via the cellular radio network to a remote user, instead of to the user of the mobile unit itself. An alarm signal may be transmitted if the derived location corresponds to a predetermined location. According to another aspect of the invention, there is provided a mobile unit for use with a cellular radio system, the mobile unit comprising apparatus for determining the position of the mobile unit; the apparatus comprising means for detecting timing differences between signals received from different radio base stations, and means for determining, from the timing differences, the differences in the distances of the mobile unit from each of the base stations; and means for deriving, from the differences in distance, the location of the mobile unit, characterised in that the mobile unit has means for determining the differences in timing at the mobile unit of a characteristic feature of a time division frame structure broadcast synchronously by the control channel of each base station. The mobile unit may further comprise means for receiving data from the currently serving base station concerning base stations within radio range of the mobile unit, the information including the geographical locations of the base stations.

The cellular radio network may be complementary to the mobile unit of the second aspect of the invention as defined above. Alternatively, the location determination functions may be performed by the network itself. Accordingly, the cellular network may comprise means for determining the difference in timing between signals transmitted by the base stations as measured at the mobile unit; means for determining, from the timing differences, the differences in the distances of the mobile unit from each of the base stations; and means for deriving, from the differences in distance, the location of the mobile unit, being characterised in that the base stations have broadcast control channels operating with synchronised time division frame structures having a characteristic feature for detection by the mobile units, and in having means for receiving from the mobile unit an indication of the arrival time at the mobile unit of the characteristic feature from each base station.

According to a further aspect of the invention, there is provided apparatus for determining the position of a mobile unit using a cellular radio system having a plurality of base stations, said apparatus comprising means for determining the differences in timing of the operation of the base stations as measured at the mobile unit; means for determining, from the timing differences, the differences in the distances of the mobile unit from each of the base stations; and means for deriving, from the differences in distance, the location of the mobile unit, characterised in that the apparatus comprises means in the network for synchronising the time division frame structures of control channels broadcast by at least a plurality of the base stations within radio range of the mobile unit, and means in the mobile unit for determining the differences in timing at the mobile unit of a characteristic feature of the time division frame structure broadcast by the control channel of each base station. The time difference measuring means, distance difference determining means and location deriving means may each form part of the mobile unit or of the fixed network. If in the mobile unit, this unit may further comprise means for receiving data from the currently serving base station concerning base stations within radio range of the mobile unit, the information including the geographical locations of the base stations.

In existing GSM systems each base station transmits a control channel (BCCH) having a TDMA frame structure. This frame structure is made up of "multiframes" each of 235.38 milliseconds. Each multiframe has a substructure of fifty-one frames, each frame having eight bursts. Each burst is made up of three "tail" bits, 142 information bits, three more "tail" bits, and a guard period equivalent in duration to 8¼ bits. The frame is thus 156¼ bits in duration, and each bit has a duration of approximately 3.9 microseconds, so a burst has a duration of 0.577 milliseconds. The frames in each multiframe are conventionally numbered 00 to 50, of which five are frequency control frames (FCCH), (00, 10, 20, 30 and 40); and five are synchronisation frames (SCH); 01, 11, 21, 31, 41. The interval between the synchronisation frames is therefore generally 46.15 msec, (80 bursts), but the interval between frames 41 and 01 has a longer duration of 50.77 msec (88 bursts) because of the presence of the extra frame 50. The synchronisation frames each include a training sequence which is used in this embodiment of the invention as the characteristic feature.

In GSM, the use of time division multiple access (TDMA) means that the mobile station and the serving base station have to be highly synchronised. For the mobile unit to decode the identity code BSIC of a base station, it has to briefly synchronise itself with that base station. Consequently, the mobile unit always has an indication of by what fraction of a frame (i.e., how many bits) each of the neighbouring base stations differ from the serving base station, as seen by the mobile unit. If the frame cycles of all the base stations were to be absolutely synchronised, (i.e. all the base stations simultaneously transmit the same part of the frame) the amount the mobile unit would have to shift its frame structure (relative to the serving nase station) to decode the BSIC of the other base stations would be purely a function of the difference in path length between the serving base station and its neighbours. In existing systems mobile units are synchronised to their serving base stations to better than ¼ bit, 0.923 microseconds, which, at the speed of light ($3 \times 10^8$ m/s), corresponds to a resolution of 277 m. This accuracy can be significantly improved upon for location purposes by using the data present in the equaliser of the mobile unit.

In GSM practice, the frame structure of each base station is in fact not synchronised in the absolute sense, but only in the relative sense that for each base station there is some point in the frame structure which is synchronised with the external synchronisation signal. Thus the timing of the frame structures of the base stations differ from each other by an arbitrary but constant amount, referred to herein as the "offset". The term "synchronised", as used in this specification, is used in this relative sense (i.e. differing by a constant amount), unless the context clearly demands otherwise.

It would be possible (although undesirable for other reasons) to reconfigure the GSM system such that the base stations are all synchronised in the absolute sense. However, in a preferred arrangement, for each base station the respective offset is subtracted from the arrival time at the mobile unit of the characteristic feature of the frame to obtain the difference between the distance that base station is from the mobile unit and the distance the serving base station is from the mobile unit. These calculations may be performed in the fixed part of the network, but in a preferred arrangement data relating to the offset associated with each base station is transmitted from the serving base station to the mobile unit, and the timing difference is determined by the mobile unit from said offset data and the arrival times of the characteristic feature from each base station. Accordingly, another aspect of the invention provides a cellular radio network for use with the mobile units defined above, comprising a plurality of base stations operating with control channels broadcasting synchronous time division frame structures, means for identifying which of the base stations are in radio range of a specified mobile unit, and means for transmitting data relating to the location and synchronisation offsets of each such base station to the mobile unit.

The timing differences provide the differences in path lengths between the various base stations, however they do not provide an absolute path length. In the prior art systems described above, the timing of signals from a minimum of three base stations is stated to be sufficient to provide a unique position fix (in two dimensions). In order to achieve this, it is necessary to know not only the difference in arrival times of the signals from the different base stations, but also their absolute arrival times relative to some fixed timescale. This requires the mobile unit to have a clock synchronised with those of the base stations. The base stations can be synchronised using the GPS system, but the mobile units cannot themselves be synchronised to the GPS system unless they too incorporate GPS receivers, thereby re-introducing the complexity sought to be avoided by using the cellular radio characteristics.

It has previously been suggested that timing advance be used to determine distance from the serving base station. Timing advance is the amount by which a mobile unit is instructed by the serving base station to advance its transmissions relative to the signals received by the mobile unit, to allow the transmissions from the mobile unit to arrive at the base station at its allocated point in the TDMA frame. The timing advance corresponds to the time taken for radio waves to cover the out-and-back distance between the base station and the mobile unit, i.e. twice the path length. However, the timing advance is only determined when a mobile unit has a call in progress. Furthermore, the timing advance is determined for the strongest signal, which is not necessarily the most direct if multipath interference is present, and its accuracy is also relatively coarse.

Instead, in one preferred arrangement according to the invention the differences in timing between at least four base stations are determined (conveniently these are the differences between the currently serving base station and each of three neighbouring ones), thereby allowing the determination of the absolute location of the mobile unit in two dimensions. As will be described below, the use of four base stations provides a unique result in two dimensions, without the need for an absolute reference in the mobile unit. In another preferred arrangement the differences in timing between at least five base stations (the serving base station and four others) are determined, thereby allowing the determination of the absolute location of the mobile unit in three dimensions. This latter arrangement is to be preferred if the differences in the altitudes of the base stations and/or the mobile unit are large in relation to the overall accuracy of the system.

Embodiments of the invention may nevertheless use timing advance information to supplement the basic method in circumstances where fewer than the minimum number of base stations are detected by the mobile unit. Other supplementary information may also be used where circumstances require, such as information relating to the direction of the mobile unit relative to the antenna. If one or more of the plurality of base stations in the cellular radio system have a very limited range, the method may comprise an additional step wherein if the mobile unit is recognised as being within range of one of said limited-range base stations the location of the mobile unit is determined to be the location of said limited-range base station.

BRIEF DESCRIPTION OF THE DRAWINGS

An embodiment of the invention will now be described with reference to the drawings in which.

DETAILED DESCRIPTION

Figure 1:
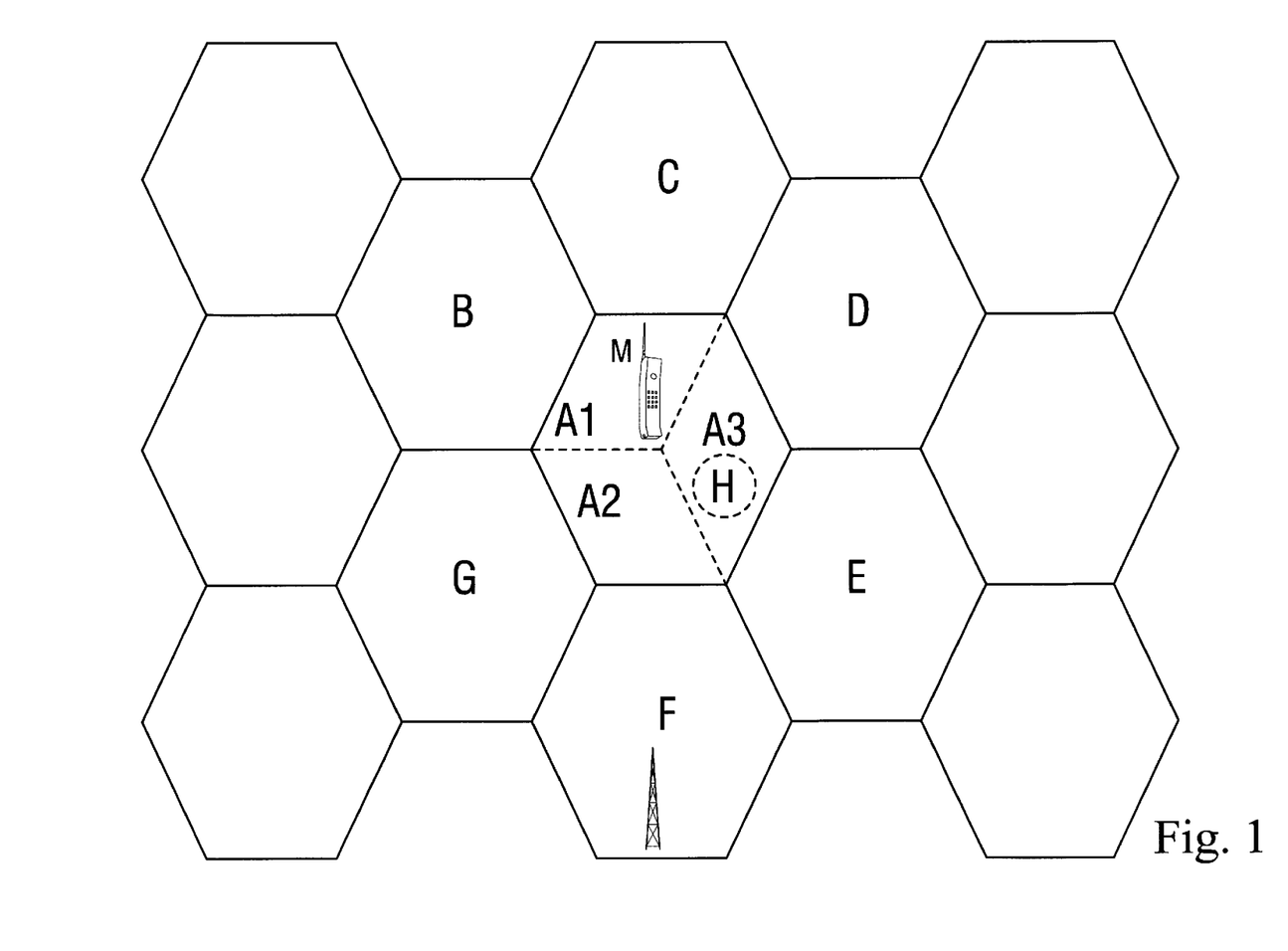
FIG. 1 shows part of a cellular radio system.

FIG. 1 shows a cellular radio system including a mobile unit M, a base station A, currently serving the mobile unit M, and six neighbouring base stations B, C, D, E, F, G. Each base station is shown as having a hexagonal coverage area, or "cell", but in practice the cells are more irregular because of topographical reasons, and base station siting. Moreover, the propagation characteristics of radio waves mean that coverage areas overlap in practice, and the mobile unit can detect signals from several nearby base stations, albeit less strongly than from the currently serving base station A. For the purposes of this illustration, it will be assumed that the mobile unit M can detect the BCCH (control channel) of base stations A, B, C, D, and E at least.

The coverage area of base station A is shown subdivided into three 120 degree sectors A1, A2, A3, each of which is served by a respective sector antenna at base station A, having its own channel allocation.

Also within the coverage of base station A there is a microcell H. This is a cell having its own low power (and therefore short range) base station, provided to serve a limited area having a high demand for call traffic, and/or which is poorly served by the main cellular structure, for example because of tall buildings.

Figure 2:
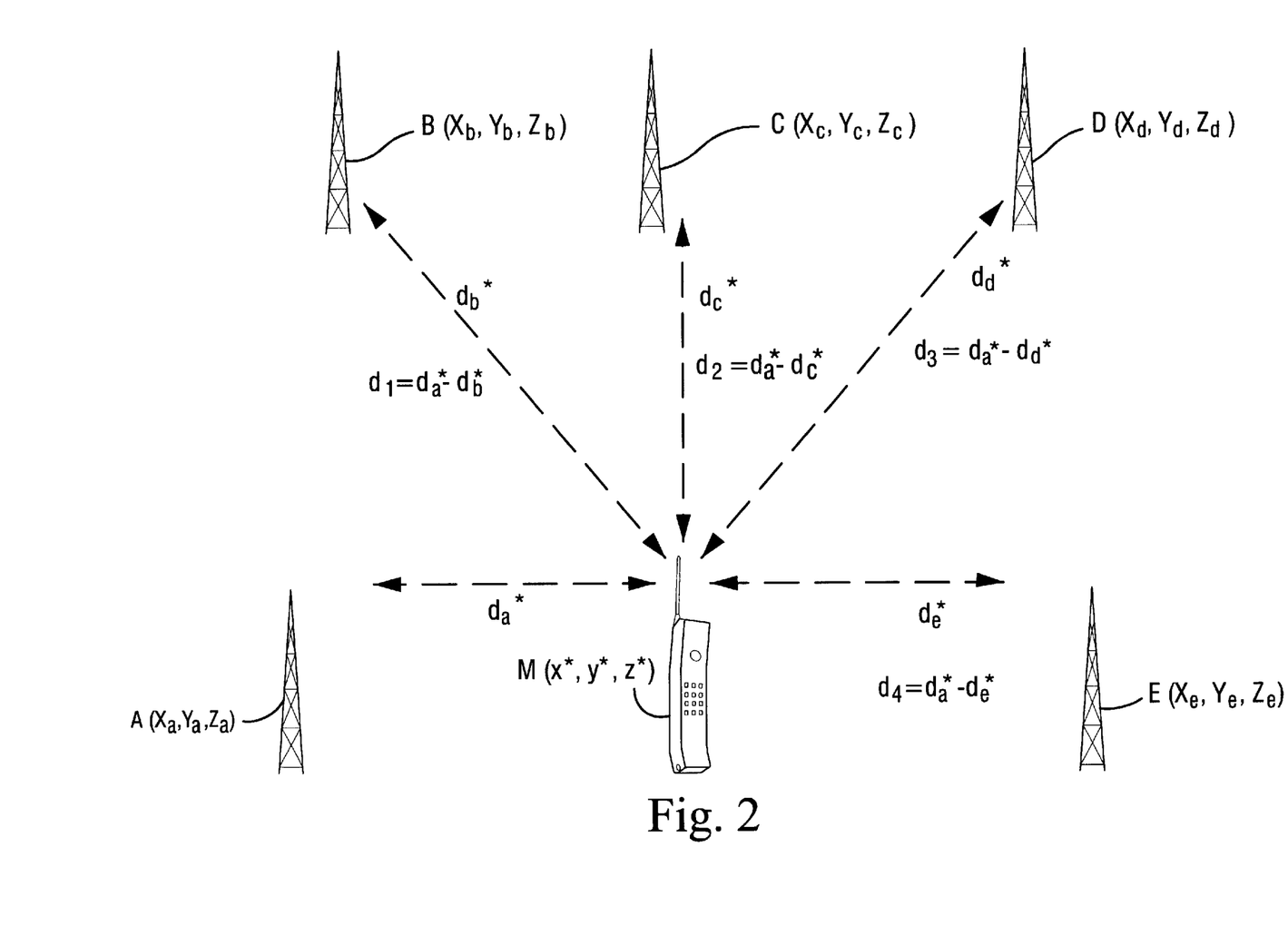
FIG. 2 is a schematic illustrating part of the system of FIG. 1 in more detail, and indicating the various parameters used in the calculations carried out in the method of the invention.

In FIG. 2, there is shown the mobile unit M and five base stations A, B, C, D, E are represented, together with their co-ordinates in three dimensions ($X_a, Y_a, Z_a; X_b, Y_b, Z_b; X_c, Y_c, Z_c; X_d, Y_d, Z_d; X_e, Y_e, Z_e$), and the distance of the mobile unit from each base station $d_a, d_b, d_c, d_d, d_e$, respectively. The unknown co-ordinates of the mobile unit M are represented as (x,y,z).

For illustrative purposes the embodiment will be described as operating according to the GSM standard, using GPS data, but this is not intended to be limitative. In GSM, each base station, (for example, the base station A) holds information relating to itself and six nearby base stations B, C, D, E, F, G. For the purpose of the present invention only four nearby base stations B, C, D, E of the six are used, the four in question generally being those providing the strongest signal at the mobile unit M. The base station transmits the data to the mobile unit M on its BCCH (Broadcast Control Channel). This data includes the radio frequency of each base station's BCCH, allowing the mobile unit to periodically sample the signal quality of each BCCH, and allow handovers to take place based on the results of this sampling.

In this embodiment of the invention information additional to that required by the GSM system is transmitted to the mobile unit, either over the BCCH or in a separate data message. This information includes the location of each of the base stations A, B, C, D, E and their relative frame offsets (as defined above). This offset indicates how the timing of the TDMA frame structure relates to a reference timeframe, which may be the time frame of the serving base station A, or of universal reference.

The radio link between the mobile unit M and the base station A is a time division multiple access (TDMA) system, in which different mobile units communicate with the base station A on the same radio frequency, at different times. At times when the base station A is transmitting to other mobile units (not shown), the mobile unit M monitors the BCCH frequencies of the nearby base stations B, C, D, E, (F, G) as identified to it by the base station A.

Each base station periodically transmits a training sequence (SCH). Specifically, in GSM, the SCH is transmitted five times in each multiframe of the BCCH, in TDMA frames 01, 11, 21, 31, and 41. This training sequence corresponds to a sequence stored in the mobile unit, which is arranged to identify correlations between the stored sequence and the BCCH transmissions, thereby allowing the mobile unit and base station to be synchronised and an estimate of the signal quality to be made.

Figure 3:
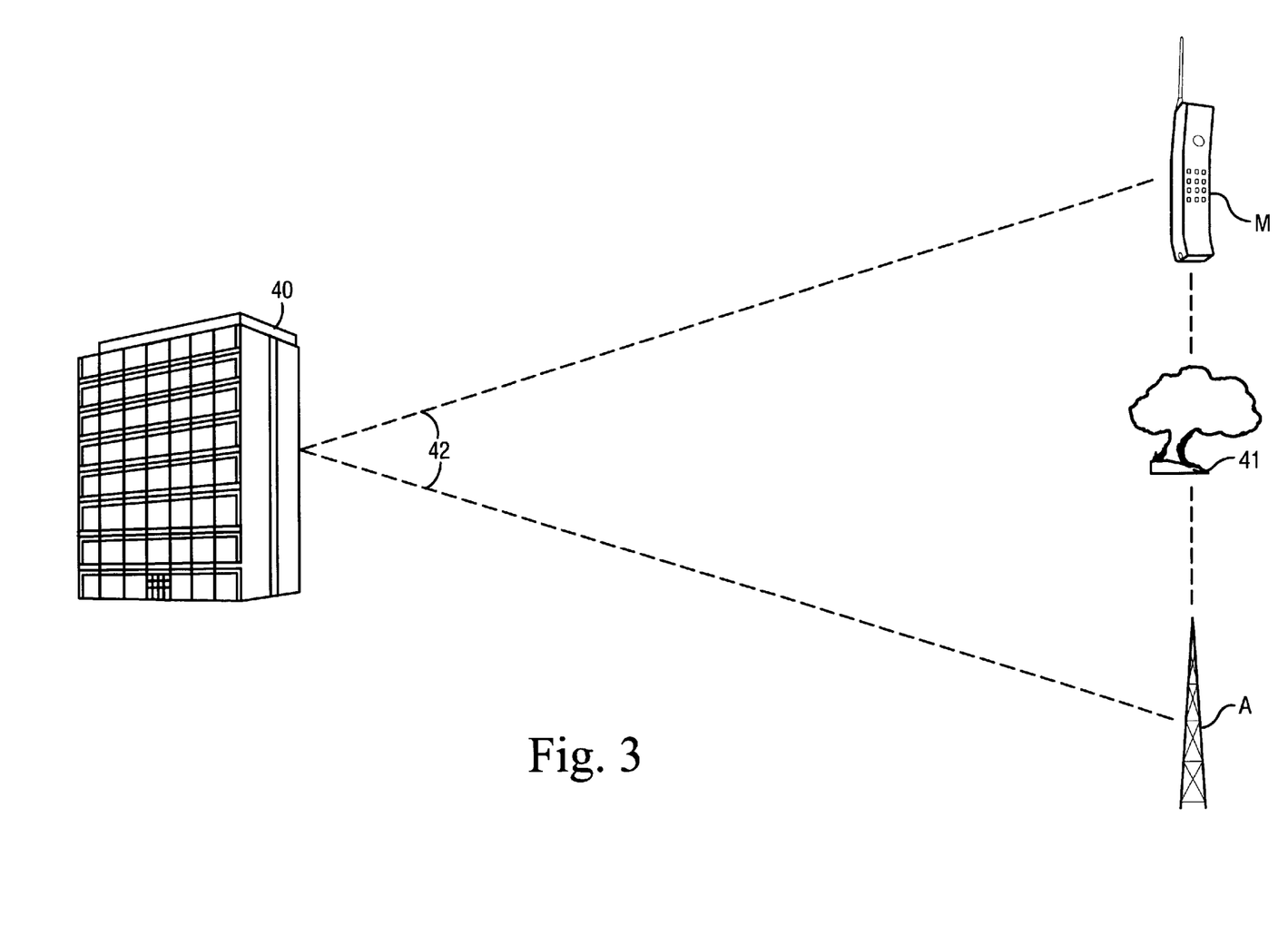
FIG. 3 illustrates multipath propagation.
Figure 4:
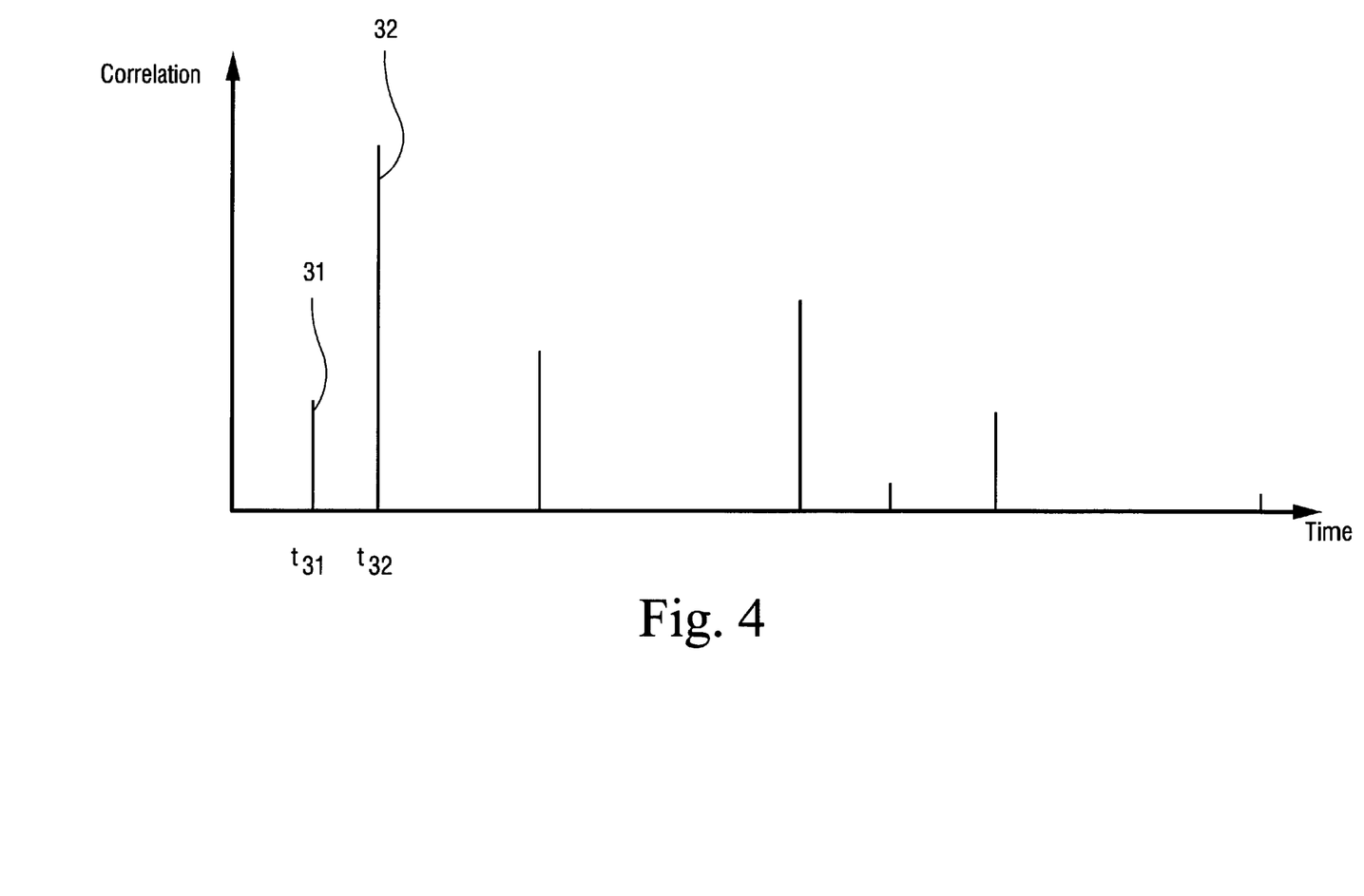
FIG. 4 shows a plot of correlation against time for a training sequence.

FIG. 3 illustrates a phenomenon known as "multipathing". In a typical environment radio signals may propagate between a base station A and a mobile unit M by a number of different paths, as a result of reflections and refraction caused by buildings and other obstructions. These paths are, in general, of different length; for example a direct path 41 is shorter than a path 42 reflected by a building 40. The correlation of the training sequence may therefore identify more than one correlation, occurring at different times. This is illustrated in FIG. 4, in which there is a first correlation 31 at time $t_{31}$ and a second, stronger correlation 32 at time $t_{32}$. This situation can occur when the direct path 41 is subject to attenuation, for example by foliage, and the in direct path 42 is not attenuated. In the example of FIG. 3, a strong indirect signal 42 will occur if the building 40 is a good reflector of radio waves.

For the purpose of assessing suitability for handover, and synchronising with a base station, the strongest correlation 32 would be used, even though this corresponds to a longer path 42 than the earlier, weaker correlation 31. However, for the purpose of position identification, the straight line distance from the base station is required and so the time of arrival of the first correlation 31 is used, and not the strongest correlation 32. The first correlation may itself relate to a reflected signal, if there is no direct line of sight path, but it will nevertheless be the closest to the time a direct signal would have arrived.

The mobile unit M identifies from the respective BCCHs the times of arrival $T_B$, $T_C$, $T_D$, $T_E$ of the first instance of the training sequence from each nearby base station B, C, D, E and compares them with the time of arrival $T_A$ of the training sequence from the serving base station A, to identify time intervals $T_1=T_B-T_A$; $T_2=T_C-T_A$; $T_3=T_D-T_A$; $T_4=T_E-T_A$. These intervals can be measured accurately by counting the number of digital bits which occur between the arrivals of these signals. This gives an accuracy of the order of 1 microsecond. The intervals will be different, as a result of three factors: difference in path length; different relative frame offsets; and transmission in different frames. It is first necessary to eliminate the latter two factors in order to determine the differences in path length.

Each base station transmits the same synchronisation training sequence five times in every control channel multiframe, that is at a time interval $t_F$. Since the mobile unit monitors control channel multiframes as a method of presynchronisation it will not always identify correlations from all the base stations A, B, C, D, E on the same part of the multiframe cycle structure. However, the time difference $t_F$ between synchronisation frames (SCH) within the control channel multiframe is approximately 46 msec in which time a radio wave will propagate approximately 13,800 km, therefore multiples of the frame length can easily be eliminated.

The different offsets of SCH within the mutiframe can be allowed for by measuring, at each base station, the time of transmission of the control channel mutiframe sequence relative to a universal reference such as the GPS synchronisation signal. The serving base station A transmits over the BCCH a signal representing the offsets of the neighbouring base stations (relative either to the universal reference or, preferably, relative to its own transmissions), thus allowing these offsets to be compensated for.

In this way a time difference $t_1=T_1-(n_1t_F+Q_B)$ can be derived, where $Q_s$ is the offset of base station B relative to base station A, $t_F$ is the frame length, and $n_1$ is an integer in normal circumstances selected such that the magnitude of $t_1$ is a minimum. GPS provides time signals accurate to 50 nanoseconds, and this may be used at the base stations to provide the timing information required to determine the offset values Q. The frame length $t_F$ is a constant of the system. The accuracy of the value of $t_1$ is therefore determined largely by the accuracy with which $T_1$ is measured (typically of the order of 1 microsecond, as already discussed).

Note that the value of $t_1$ may be negative, if the base station B is closer to the mobile unit than the serving base station A, as may occur if the base station A has a stronger signal at the mobile unit than base station B, despite its greater distance, or if no traffic channel is available on base station B. As stated above, the interval between SCH frames is either 88 bursts or 80, and thus there are two possible values for $t_F$ (46.15 or 50.77 milliseconds). The position within the multiframe can easily be determined by the mobile unit, and the appropriate value of $t_F$ selected.

Values $t_2=T_2-(n_2t_F+QC)$, $t_3=T_3-(n_3t_F+QD)$, and $t_4=T_4-(n_4t_F+QE)$ can be derived in a similar way.

The values $t_1$, $t_2$, $t_3$, and $t_4$, when multiplied by c, the speed of propagation of radio waves, produce values $d_1$, $d_2$, $d_3$, and $d_4$ which are the differences between path length $d_a$, and the path lengths $d_b$, $d_c$, $d_d$, and $d_e$ respectively (see FIG. 1). Specifically, $d_1=d_a-d_b$; $d_2=d_a-d_c$; $d_3=d_a-d_d$; and $d_4=d_a-d_e$.

It will be appreciated that the mobile unit has no means of detecting the GPS synchronisation pulse itself, as it is not a GPS receiver. The arrival times of the training sequences can therefore only be measured relative to each other, not against an absolute timescale, and therefore the time $t_a$ it takes the training signal to reach the mobile unit M from the base station A is unknown. Thus the distance $d_a$ of the mobile unit M from the base station A (which is simply the distance radio waves propagate in this unknown time $t_a$) cannot be derived directly (and similarly for base stations B, C, D, E). The relative arrival times indicate only that base station B, for example, is further from mobile unit M than base station A by a distance $d_1=d_a-d_b$.

To enable the mobile unit to calculate its position, it has to know the location of the base station sites in its area. This Information could be passed to the mobile unit by either using a "Cell Broadcas" message or a Short Message Service (SMS) as provided on some cellular systems; both are capable of message lengths up to an ample 160 characters. Information sent to the mobile unit from a base station would include; the co-ordinates of that base station, and information about the neighbouring base stations such as their locations and their offsets (the timing of the training sequence relative to a universal standard, or relative to the serving base station), a flag to indicate if a base station was precisely synchronised, time, and date.

The serving base station A transmits not only its own details, but also details of its neighbours B, C, D, E. The mobile unit M can then get all the information it needs without having to handover to the other base stations. The rate at which such information is broadcast would have to be dimensioned to allow the mobile unit to calculate its position quickly, this would be especially important if a tracking service is to make use of the information. The "Short Message Service" (SMS) available in the GSM system could be used when a customer initially requests the service, to provide authentication and prevent unauthorised use. Once a customer has been validated as a user, SMS could then pass a ciphering key to the mobile unit to allow it to decode the cell broadcast message. This system would be relatively secure as the messages passing over the radio interface are already protected by GSM's ciphering system.

SMS could be used instead of the Cell Broadcast system to pass all the base station site location information to a mobile unit and allow it to calculate its position. This method would be less prone to fraud than a Cell Broadcast, as SMS is a point to point system. However the large number of messages required to reach a potentially large number of mobile units could prove to be too high an overhead on the network. Another problem with an SMS based system is identifying which base station sites' details to send to a particular mobile unit without first knowing where the mobile unit is. Hence a mobile unit's serving base station ID would have to be known by the network before the information concerning its neighbouring base stations can be transmitted over SMS.

A tracking service would require the use of SMS originating from the mobile unit if the location were to be passed to a remote centre, for example the emergency services or a fleet control centre. Position information transmitted from the mobile unit could include a time stamp to allow for delays in the SMS network and the motion of the mobile unit.

The determination of position from timing differences will now be described in detail. It will be seen from the following that five base stations is the minimum necessary to ensure an unambiguous result in three dimensions if the absolute distance from none of them is known. If only two dimensions are considered, four base stations are sufficient.

FIG. 2 shows the information available to the mobile unit. The values x, y and z represent the mobile unit's position in three dimensions, which are to be calculated. The values $X_a$, etc indicate the known positions of the base stations, as transmitted to the mobile unit M over the BCCH.

Consider five base stations:
Base station A at $(X_a,Y_a,Z_a)$: distance to mobile unit is $d_a$
Base station B at $(X_b,Y_b,Z_b)$: distance to mobile unit is $d_b$
Base station C at $(X_c,Y_c,Z_c)$: distance to mobile unit is $d_c$
Base station D at $(X_d,Y_d,Z_d)$: distance to mobile unit is $d_d$
Base station E at $(X_e,Y_e,Z_e)$: distance to mobile unit is $d_e$ The mobile unit scans the base stations and measures the timing differences $t_1, t_2, t_3, t_4$ between the serving base station and each surrounding base station, as described above. These timing differences are directly proportional to the path length differences: $d_1 = t_1 c$, where c is the speed of propagation of radio waves, approximately 300 metres per microsecond. Hence the mobile unit can easily calculate $d_1$ to $d_4$ where;

$d_1 = d_a - d_b$
$d_2 = d_a - d_c$
$d_3 = d_a - d_d$
$d_4 = d_a - d_e$

The following five equations represent the mobile unit's location, based on the equation for a sphere;

$$(x-X_a)^2 + (y-Y_a)^2 + (z-Z_a)^2 = d_a^2 \quad \text{Equation [1]}$$

$$(x-X_b)^2 + (y-Y_b)^2 + (z-Z_b)^2 = d_b^2 \quad \text{Equation [2]}$$

$$(x-X_c)^2 + (y-Y_c)^2 + (z-Z_c)^2 = d_c^2 \quad \text{Equation [3]}$$

$$(x-X_d)^2 + (y-Y_d)^2 + (z-Z_d)^2 = d_d^2 \quad \text{Equation [4]}$$

$$(x-X_e)^2 + (y-Y_e)^2 + (z-Z_e)^2 = d_e^2 \quad \text{Equation [5]}$$

Now, $d_1 = d_a - d_b$. Rewritten as $d_1 - d_a = -d_b$, and squaring both sides gives;

$$d_1^2 - 2d_1 d_a + d_a^2 = d_b^2 \quad \text{Equation [6]}$$

Substitute [1] and [2] into [6];

$$d_1^2 - 2d_1 d_a + (x-X_a)^2 + (y-Y_a)^2 + (z-Z_a)^2 = (x-X_b)^2 + (y-Y_b)^2 + (z-Z_b)^2$$

Rearranging to put known variables on the right hand side gives;

$$-d_1 d_a - x(X_a - X_b) - y(Y_a - Y_b) - z(Z_a - Z_b) = k_1/2 \quad \text{Equation (7a)}$$

Where $k_1$ consists of the known values;

$$k_1 = -d_1^2 - X_a^2 - Y_a^2 - Z_a^2 + X_b^2 - Y_b^2 - Z_b^2$$

For simplicity we define:

$$X_{ab} = X_a - X_b,$$

$$Y_{ab} = Y_a - Y_b,$$

and:

$$Z_{ab} = Z_a - Z_b.$$

Equation 7a becomes:

$$-d_1 d_a - x X_{ab} - y Y_{ab} - z Z_{ab} = k_1/2 \quad \text{Equation [7]}$$

Repeating this process with equations [3] to [5] gives;
Base stations A and C $$-d_2 d_a - x X_{ac} - y Y_{ac} - z Z_{ac} k_2/2 \quad \text{Equation [8]}$$

Where;

$$k_2 = -d_2^2 - X_a^2 - y_a^2 - Z_a^2 + X_c^{2+Y_c^2 + Z_c^2}$$

Base stations A and D $$-d_3 d_a - x X_{ad} - y Y_{ad} - z Z_{ad} k_3/2 \quad \text{Equation [9]}$$

Where $$k_3 = -d_3^2 - X_a^2 - Y_a^2 - Z_a^2 + X_d^{2+Y_d^2 + Z_d^2}$$

Base stations A and E $$-d_4 d_a - x X_{ae} - y Y_{ae} - z Z_{ae} k_4/2 \quad \text{Equation [10]}$$

Where $$k_4 = -d_4^2 - X_a^2 - Y_a^2 - Z_a^2 + X_e^{2+Y_e^2 + Z_e^2}$$

Rearranging equation [7] in terms of $d_a$;

$$d_a = \frac{-1}{d_1}\left(\frac{k_1}{2} + xX_{ab} + yY_{ab} + zZ_{ab}\right) \qquad \text{Equation [11]}$$

Substitution of [11] into [8] leads to;

$$x(X_{ab}d_2 - X_{ac}d_1) + y(Y_{ab}d_2 - Y_{ac}d_1) + \qquad \text{Equation [12]}$$
$$z(Z_{ab}d_2 - Z_{ac}d_1) - \left(\frac{d_1k_2 - d_2k_1}{2}\right) = 0$$

Substitution of [11] into [9] leads to;

$$x(X_{ab}d_3 - X_{ad}d_1) + y(Y_{ab}d_3 - Y_{ad}d_1) + \qquad \text{Equation [13]}$$
$$z(Z_{ab}d_3 - Z_{ad}d_1) - \left(\frac{d_1k_3 - d_3k_1}{2}\right) = 0$$

Substitution of [11] into [10] leads to;

$$x(X_{ab}d_4 - X_{ab}d_1) + y(Y_{ab}b_4 + Y_{ac}d_1) + \qquad \text{Equation [14]}$$
$$z(Z_{ab}d_4 - Z_{ae}d_1) - \left(\frac{d_1k_4 - d_4k_1}{2}\right) = 0$$

For two-dimensional positioning, all z co-ordinates can be ignored. This will induce an error due to the fact that the four base stations and the mobile unit are unlikely to all be in exactly the same plane. In particular, base stations are, whenever possible, mounted on hills or tall structures (buildings or purpose-built masts) to improve their range, whilst mobile units generally operate near ground level. However, when the differences in altitude are small (of the order of the accuracy of the system as a whole) the error will be insignificant.

Subject to these limitations, we can solve in two dimensions by ignoring the z co-ordinates from the equations and from the calculation of the terms $k_1$, $k_2$, etc. Equation [12] then becomes;

$$x(X_{ab}d_2 - X_{ac}d_1) + y(Y_{ab}d_2 - Y_{ac}d_1) - \left(\frac{d_1k_2 - d_2k_1}{2}\right) = 0$$

and equation [13] becomes;

$$x(X_{ab}d_3 - X_{ad}d_1) + y(Y_{ab}d_3 - Y_{ab}d_1) - \left(\frac{d_1k_3 - d_3k_1}{2}\right) = 0$$

Both of these equations represent straight lines in the x y plane. The point where these two lines cross represents the mobile unit's position. This point can be found by substituting one equation into the other.

In three dimensions equations [12], [13] and [14] each represent planes in space. The intersection of two planes represents a straight line, hence all three equations are needed to find the mobile unit location (x, y, z) uniquely.

The general equation of a plane is; $Ax+By+Cz+D=0$
For equation [12]; $A=X_{ab}d_2-X_{ac}d_1$; $B=Y_{ab}d_2-Y_{ac}d_1$; $C=Z_{ab}d_2-X_{ac}d_1$; and $$D = -\left(\frac{d_1k_2 - d_2k_1}{2}\right)$$

To solve the intersection of the three planes, the equations need to be put into Hessian form. For equation [12];

$$n_1^2 = \frac{A^2}{A^2+B^2+C^2} \qquad n_2^2 = \frac{B^2}{A^2+B^2+C^2}$$
$$n_1^2 = \frac{C^2}{A^2+B^2+C^2} \qquad p^2 = \frac{D^2}{A^2+B^2+C^2}$$

The plane can now be simply represented as a vector;
 nx=−p, where:

$$n=n_1i+n_2i+n_3k$$

Once all the planes are represented in this form, the intersection can easily be calculated.

It should be noted that much of the software required to process time difference information already exists in mobile units. This information may be communicated to the network for position calculations to be made. Alternatively, the position calculation can be carried out in the mobile unit itself with very little network overhead. This system would be able to support a large number of users as it does not necessitate calls to be made, apart from initial authenticating SMS messages. However, such a system would require the addition of special software in the mobile unit to perform the necessary calculations. Improvements in the signal processing, for example by using data retrieved from the mobile unit's equaliser, may also be used to resolve to rather better than the ¼ bit (0.923 microseconds, equivalent to 277 metres) needed purely for bit synchronisation. The data present in the equaliser of the mobile unit should allow resolution to 4% of one bit, equivalent to approximately 50 metres.

Factors such as multipath, shadowing and fading may cause the accuracy of the location calculation to vary with time. Therefore, it is desirable to use time averaging in the location calculation algorithm to improve the accuracy.

There are a number of possible services that could be provided as adjuncts to a positioning service. Large amounts of money are defrauded from the cellular radio industry by illegal practices such as "cloning", which is the fraudulent practice of giving one mobile unit. usually a stolen one, the electronic identity of another, legitimate, unit. Calls made on the "clone" are then charged by the cellular network to the legitimate user. The existence of a clone is usually only detected when the legitimate user gets his bill, or if both the clone and legitimate user attempt to access the system simultaneously. Providing a built-in location service would mean that a stolen or otherwise suspicious mobile unit could be quickly located and recovered.

Similarly, a mobile unit built into a vehicle would enable the vehicle to be located, if it should be stolen. For such services to be effective the location software would have to be enabled remotely, either by the official owners or by the police.

Accurate positional information would prove invaluable to the emergency services in other ways. The service would allow help to be directed quickly and efficiently to a person in distress making an emergency call from a mobile unit so fitted. It may be desirable that the customer has control as to whether the service is activated, to avoid any customer perception that they are under surveillance by the authorities.

The emergency services, and other organisations with large field forces such as utility companies, may themselves make use of the cellular network, in place of a private mobile network (PMR), and the tracking service would allow a controller to monitor the distribution of his field force personnel.

A tracking service can also be used to monitor the progress of valuable or sensitive cargoes. The system could be arranged to warn of deviations from a preset route. Another application could be an alarm service to alert weary train travellers when they reach their home station.

As stated above, a signal needs to be received from four base stations in order to provide a position fix in two dimensions, (five base stations for three dimensions). There are some circumstances when fewer base stations are within range. In these circumstances various supplementary methods may be used to obtain a position fix.

In one possible arrangement the mobile unit may be forced to hand over from the currently serving base station A to a neighbouring base station, for example Base Station B (see FIG. 1). This base station will have a different "neighbour list" from that of Base Station A (although the lists will have several base stations in common). Between the two neighbour lists there may be sufficient base stations in range of the mobile unit for a fix to be obtained. The base stations in each neighbour list will each have their offsets determined according to the respective base station A or B, but this can be allowed for because the offset of base station B relative to base station A is known, since they are in each others neighbour lists.

Other supplementary methods may also be employed. For example the absolute distance to the currently serving base station may be derived from the timing advance; what is, the amount by which the mobile unit's transmissions need to be advanced relative to the signals received from the base station such that they arrive at the base station in the correct time slot. This is only accurate to about 600 metres, anci the timing advance is normally only calculated when a call is in progress, not when the mobile unit is on standby.

As shown in FIG. 1 for base station A, one (or more) cells may be sectored, that is, the base station has several antennas each serving a limited azimuthal range (typically 60 or 120 degrees). Identification of the sector A1 serving the mobile unit may be used to identify which solution of the equations is correct. However, this method is not practical where the base station has an omnidirectional antenna, nor where two or more possible results all occur in the same sector A1. In particular, since the sectoring is azimuthal, it will not resolve an ambiguity in the z coordinate (altitude). Furthermore, there is a possibility that a side or rear lobe of the sector antenna might be detected.

A further possibility is to identify, from the possible solutions, the one which is closest to the previously identified location of the mobile unit as being the one most likely to be the new one. This can be reasonably reliable if the mobile unit is travelling slowly in comparison to the time between location updates. FIG. 1 also shows a microcell H. Microcells are very small cells served by low power base stations often mounted well below roof-top level or even indoors to provide additional coverage in locations of very high demand. It is very likely that a GPS receiver would not operate in such a base station, as it would not be reliably visible to the satellites, as well as being cost prohibitive. Moreover, because the antenna of the microcell H is likely to be at low level or indoors it is probable that a mobile Linit in range of a microcell base station is not in radio range of as many as four base stations, and possibly is in range of no base station other than that serving the microcell H. However, because the microcell H only covers a very small area, the information that the mobile unit M is within range of the microcell H can give sufficient accuracy to locate the mobile unit to the same accuracy as the basic system.

All of these supplementary processes have the potential for systematic errors, and lower accuracy than the basic system, and also require additional processing, but may be used, individually or in combination, to maintain the service when fewer base stations than the minimum four (five) are within range of the mobile unit.

The GPS system has systematic errors in it, resulting in an accuracy of about 100 metres. For some applications, such as surveying, greater accuracy is required, and a system known as "differential GPS" has been developed to overcome this. This involves placing a GPS receiver at a precisely known "beacon" position and measuring the error in its position as measured by GPS, which error value is then transmitted to other users. The position location system of the present invention requires a significant number of cellular base stations to have GPS receivers fitted, to provide accurate synchronising signals. Since the positions of the cellular base stations are fixed, they can be determined by other means with great accuracy, allowing them to be used to offer such a differential GPS beacon service.

What is claimed is:

1. A method of determining the location of a mobile unit of a cellular radio system having a plurality of base stations, comprising the steps of determining differences in timing between transmissions from the base stations as measured at the mobile unit, determining from the timing differences differences in distances of the mobile unit from each of the base stations, and deriving the location of the mobile unit from the differences in distances so determined, wherein time division frame structures of control channels of at least some of the base stations within radio range of the mobile unit are synchronized with each other, and the mobile unit determines differences in timing at the mobile unit of a characteristic feature of the time division frame structure broadcast by the control channel of each base station.

2. A method according to claim 1, in which the differences in timing between transmissions from at least four base stations are determined, and the location of the mobile unit in two dimensions is derived.

3. A method according to claim 1, in which the differences in timing between transmissions from at least five base stations are determined, and the location of the mobile unit in three dimensions is derived.

4. A method according to claim 2, wherein if the differences in timing between transmissions from fewer than four base stations are determined by the mobile unit, a timing advance required for communication with the base station serving the mobile unit is used to derive the distance between the mobile unit and the serving base station.

5. A method according to claim 2, wherein if the differences in timing between transmissions from fewer than four base stations are determined by the mobile unit, information relating to the direction of the mobile unit relative to one or more of the base stations is additionally used to derive the location of the mobile unit.

6. A method according to claim 1, in which timings of the base stations' time division frame structures are offset relative to each other, and in which for each base station the respective offset is subtracted from the arrival time of the characteristic feature of the time division frame structure to obtain the difference between the distance that base station is from the mobile unit and the distance the base station serving the mobile unit is from the mobile unit.

7. A method according to claim 6, wherein data relating to the offset associated with each base station is transmitted from the serving base station to the mobile unit, and distances are determined by the mobile unit from said offset data and the arrival times of the characteristic feature.

8. A method according to claim 1, in which the characteristic feature is a training signal transmitted by each base station, and the mobile unit identifies correlations of the training signals received from each base station with a reference training signal stored by the mobile unit.

9. A method according to claim 8, in which the cellular radio system operates according to the GSM standard, and the training signal is the synchronisation burst (SCH) transmitted according to that standard.

10. A method according to claim 8, in which the first identified correlation of the reference training signal, corresponding to the most direct signal path, is used for distance determinations.

11. A method according to claim 1, in which the derived location is time averaged.

12. A method according to claim 1, wherein one or more of the plurality of base stations in the cellular radio system have a very short range, and comprising the additional step wherein if the mobile unit is recognised as being within range of one of said short-range base stations the location of the mobile unit is determined to be the location of said short-range base station.

13. A method according to claim 1, wherein the derived location is communicated via the cellular radio network to a remote user.

14. A method according to claim 1, wherein, if the derived location corresponds to a predetermined location, an alarm signal is transmitted.

15. A mobile unit for use with a cellular radio system, the mobile unit comprising apparatus for determining the location of the mobile unit; the apparatus comprising means for determining timing differences of signals received from different radio base stations, and means for determining, from the timing differences, differences in the distances of the mobile unit from each of the base stations; and means for deriving, from the differences in distances, the location of the mobile unit, wherein the mobile unit has means for determining differences in timing at the mobile unit of a characteristic feature of a time division frame structure broadcast by a control channel of each base station and the time division frame structures of the base stations are synchronized with each other.

16. A mobile unit according to claim 15, wherein the means for determining timing differences determines the timing differences of signals received from at least four base stations, and wherein the means for deriving derives the location of the mobile unit in two dimensions.

17. A mobile unit according to claim 15, wherein the means for determining timing differences determines the timing differences of signals received from at least five base stations, and wherein the means for deriving derives the location of the mobile unit in three dimensions.

18. A mobile unit according to claim 16, wherein the means for deriving derives the distance between the mobile unit and the base station serving the mobile unit from a timing advance required for communication with the serving base station if timing differences of signals received from fewer than four base stations are determined by the mobile unit.

19. A mobile unit according to claim 16, further comprising means for determining the direction of the mobile unit relative to one or more of the base stations if timing differences of signals received from fewer than four base stations are determined by the mobile unit.

20. A mobile unit according to claim 15, further comprising means for receiving data concerning the locations of the base stations.

21. A mobile unit according to claim 20, further comprising means for receiving data concerning an amount by which frame timings of other base stations are offset relative to the base station currently serving the mobile unit, and means for subtracting, for each base station, the offset from the arrival time of a frame to obtain a difference between the distance between that base station and the mobile unit, and the distance between the serving base station and the mobile unit.

22. A mobile unit according to claim 15, arranged to operate according to the GSM standard, and wherein the characteristic feature is the synchronisation burst (SCH) transmitted according to that standard.

23. A mobile unit according to claim 15, further comprising means for identifying base stations within radio range of the mobile unit.

24. A mobile unit according to claim 15, further comprising means for identifying a predetermined location, and alarm means for signalling to a user that the location of the device corresponds to the predetermined location.

25. In combination with the mobile unit of claim 21, a cellular radio network comprising a plurality of base stations operating with control channels broadcasting synchronous time division frame structures, means for identifying which of the base stations are in radio range of a specified mobile unit, and means for transmitting data relating to the location and synchronisation offset of each such base station to the mobile unit.

26. A cellular radio network comprising a plurality of base stations operating with control channels broadcasting synchronous time division frame structures, means for identifying which of the base stations are in radio range of a specified mobile unit, means for determining differences in timing between signals transmitted by the base stations as measured at the mobile unit; means for determining, from the timing differences, differences in the distances of the mobile unit from each of the base stations; and means for deriving, from the differences in distances, the location of the mobile unit, wherein the base stations have broadcast control channels operating with time division frame structures that are synchronized with each other and have a characteristic feature for detection by the mobile unit, and have means for receiving from the mobile unit an indication of the arrival time at the mobile unit of the characteristic feature transmitted from each base station.

27. A cellular radio network according to claim 26, arranged to operate according to the GSM standard, and wherein the characteristic feature is the synchronisation burst (SCH) transmitted according to that standard.

28. A cellular radio network according to claim 26, wherein the means for determining timing differences determines the differences in timing at the mobile unit of signals received from at least four base stations, and wherein the means for deriving derives the location of the mobile unit in two dimensions.

29. A cellular radio network according to claim 26, wherein the means for determining timing differences determines the differences in timing at the mobile unit of signals received from at least five base stations, and wherein the means for deriving derives the location of the mobile unit in three dimensions.

30. A cellular radio network according to claim 28, wherein the means for deriving derives the distance of the mobile unit from the base station serving the mobile unit from a timing advance required for communication with the serving base station, if timing differences of signals received from fewer than four base stations are determined by the mobile unit.

31. A cellular radio network according to claim 28, further comprising means for determining the direction of the mobile unit relative to one or more of the base stations if timing differences of signals received from fewer than four base stations are determined by the mobile unit.

32. A cellular radio system according to claim 26, in which timings of the base stations frame structures are offset relative to each other, and further comprising means for subtracting the respective offset from the arrival time of the characteristic feature of the time division frame structure at the mobile unit to obtain the difference between the distance that base station is from the mobile unit and the distance the base station serving the mobile unit is from the mobile unit.

33. Apparatus for determining the location of a mobile unit using a cellular radio system having a plurality of base stations, said apparatus comprising means for determining differences in timing of the operation of the base stations as measured at the mobile unit; means for determining, from the timing differences, differences in the distances of the mobile unit from each of the base stations; and means for deriving, from the differences in distances, the location of the mobile unit, wherein the apparatus comprises means in the network for synchronizing time division frame structures of control channels broadcast by at least a plurality of the base stations within radio range of the mobile unit with each other, and means in the mobile unit for determining differences in timing at the mobile unit of a characteristic feature of the time division frame structure broadcast by the control channel of each base stations.

34. Apparatus according to claim 33, wherein the time difference determining means, distance difference determining means and location deriving means form part of the mobile unit.

35. Apparatus according to claim 34, further comprising means for identifying base stations within radio range of the mobile unit, and means for transmitting data to the mobile unit relating to the geographical locations of the identified base stations.

36. Apparatus according to claim 33, further comprising means for determining and compensating for offsets in synchronization between transmissions of the base stations.

37. Apparatus according to claim 33, arranged to operate according to the GSM standard, and wherein the characteristic feature is the synchronisation burst (SCH) transmitted according to that standard.

38. Apparatus according to claim 33, wherein the means for determining timing differences determines the differences in timing at the mobile unit of signals received from at least four base stations, and wherein the means for deriving derives the location of the mobile unit in two dimensions.

39. Apparatus according to claim 33, wherein the means for determining timing differences determines the differences in timing at the mobile unit of signals received from at least five base stations, and wherein the means for deriving derives the location of the mobile unit in three dimensions.

40. Apparatus according to claim 38, wherein the means for deriving derives the distance of the mobile unit from the base station serving the mobile unit from a timing advance required for communication with the serving base station, if timing differences for signals received from fewer than four base stations are determined by the mobile unit.

41. Apparatus according to claim 38, further comprising means for determining the direction of the mobile unit relative to one or more of the base stations if timing differences of signals received from fewer than four base stations are determined by the mobile unit.

42. Position-finding device according to claim 1 comprising means for identifying a predetermined geographical location, and alarm means for signalling to a user that the geographical location of the device corresponds to the predetermined location.

43. A method according to claim 3, wherein if the differences in timing between transmissions from fewer than five base stations are determined by the mobile unit, a timing advance required for communication with the base station serving the mobile unit is used to derive the distance between the mobile unit and the serving base station.

44. A method according to claim 3, wherein if the differences in timing between transmissions from fewer than five base stations are determined by the mobile unit, information relating to the direction of the mobile unit relative to one or more of the base stations is additionally used to derive the location of the mobile unit.

45. A mobile unit according to claim 17, wherein the means for deriving derives the distance between the mobile unit and the base station serving the mobile unit from a timing advance required for communication with the serving base station if timing differences of signals received from fewer than five base stations are determined by the mobile unit.

46. A mobile unit according to claim 17, further comprising means for determining the direction of the mobile unit relative to one or more of the base stations if timing differences of signals received from fewer than five base stations are determined by the mobile unit.

47. A cellular radio network according to claim 29, wherein the means for deriving derives the distance of the mobile unit from the base station serving the mobile unit from a timing advance required for communication with the serving base station, if timing differences of signals received from fewer than five base stations are determined by the mobile unit.

48. A cellular radio network according to claim 29, further comprising means for determining the direction of the mobile unit relative to one or more of the base stations if timing differences of signals received from fewer than five base stations are determined by the mobile unit.

49. Apparatus according to claim 39, wherein the means for deriving derives the distance of the mobile unit from the base station serving the mobile unit from a timing advance required for communication with the serving base station, if timing differences for signals received from fewer than five base stations are determined by the mobile unit.

50. Apparatus according to claim 39, further comprising means for determining the direction of the mobile unit relative to one or more of the base stations if timing differences of signals received from fewer than five base stations are determined by the mobile unit.

* * * * *